(12) United States Patent
Borude et al.

(10) Patent No.: US 12,256,115 B2
(45) Date of Patent: Mar. 18, 2025

(54) SYSTEM AND METHOD OF FACILITATING PEER TO PEER DISTRIBUTION NETWORK USING SET TOP BOXES

(71) Applicant: Jio Platforms Limited, Ahmedabad (IN)

(72) Inventors: Ajit Borude, Maharashtra (IN); Gaurav Duggal, Telangana (IN); Kaushik Gnanasekar, Maharashtra (IN); Manoj Kumar Garg, Madhya Pradesh (IN); Aditya Bal, Maharashtra (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 117 days.

(21) Appl. No.: 17/704,902

(22) Filed: Mar. 25, 2022

(65) Prior Publication Data

US 2022/0312060 A1 Sep. 29, 2022

(30) Foreign Application Priority Data

Mar. 27, 2021 (IN) .............................. 202121013640

(51) Int. Cl.
*H04N 21/231* (2011.01)
*H04N 21/25* (2011.01)
*H04N 21/262* (2011.01)
*H04N 21/63* (2011.01)

(52) U.S. Cl.
CPC ......... *H04N 21/262* (2013.01); *H04N 21/231* (2013.01); *H04N 21/251* (2013.01); *H04N 21/63* (2013.01); *H04N 21/632* (2013.01)

(58) Field of Classification Search
CPC ..... H04N 21/231; H04N 21/63; H04N 21/632
See application file for complete search history.

(56) References Cited

U.S. PATENT DOCUMENTS

| | | | |
|---|---|---|---|
| 11,417,099 B1 * | 8/2022 | Hillman Beauchesne | ............... G06V 20/46 |
| 2005/0021771 A1 * | 1/2005 | Kaehn | ............... H04L 69/329 709/228 |
| 2007/0050761 A1 * | 3/2007 | Hester | ............... H04L 67/1068 717/168 |
| 2009/0106425 A1 * | 4/2009 | Zuckerman | ......... H04L 67/1046 709/226 |
| 2009/0300673 A1 * | 12/2009 | Bachet | ................ H04N 21/632 725/31 |
| 2011/0276669 A1 * | 11/2011 | Wei | .................... H04L 67/1074 709/222 |

(Continued)

*Primary Examiner* — Pinkal R Chokshi
(74) *Attorney, Agent, or Firm* — FINNEGAN, HENDERSON, FARABOW, GARRETT & DUNNER LLP

(57) ABSTRACT

The present invention provides a robust and effective solution to an entity or an organization by enabling a plurality of set top boxes (STBs) to be used as seeders for peer to peer network distribution of data. The plurality of STBs may be used to utilize the Internet for downloading content of the network along with streaming of the content. After downloading the content by the STB by following a predefined set of instructions, the STB may provide the downloaded content to the network. After a predefined time, the STB would not be able to transfer data via internet because a sever coupled to the STB may automatically stop accepting incoming connections to download from other STBs associated with the network.

18 Claims, 13 Drawing Sheets

(56) References Cited

U.S. PATENT DOCUMENTS

| | | | |
|---|---|---|---|
| 2012/0158527 A1* | 6/2012 | Cannelongo | H04N 21/2668 |
| | | | 707/748 |
| 2015/0180795 A1* | 6/2015 | El-Ansary | H04L 67/1061 |
| | | | 709/226 |
| 2017/0134485 A1* | 5/2017 | Kim | H04L 67/1046 |
| 2018/0302470 A1* | 10/2018 | Swanson | G06F 16/176 |
| 2020/0167745 A1* | 5/2020 | Shin | G06Q 20/0855 |

\* cited by examiner

|   | Hash Of Data | Movie ID | Node IP |
|---|---|---|---|
| 1 | A6282C225F4B6D0018EBE123FAB7B8CD | 648481 | 10.122.133.45 |
| 2 | A6282C225F4B6D0018EBE123FAB7B8CD | 648481 | 10.122.133.46 |
| 3 | A6282C225F4B6D0018EBE123FAB7B8CD | 648481 | 10.122.133.47 |
| 4 | A6282C225F4B6D0018EBE123FAB7B8CD | 648481 | 13.122.133.48 |
| 5 | B425CE99CD88D3DF6249DBA487D39056 | 648481 | 10.122.133.45 |
| 6 | 225C1B5AA1F00135471456457D7925BC | 648481 | 10.122.12.87 |
| 7 | B425CE99CD88D3DF6249DBA487D39056 | 648481 | 10.122.12.86 |
| 8 | 225C1B5AA1F00135471456457D7925BC | 648481 | 13.122.133.11 |

FIG. 7B

SYSTEM AND METHOD OF FACILITATING PEER TO PEER DISTRIBUTION NETWORK USING SET TOP BOXES

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to system and methods that facilitate peer to peer network distribution. More particularly, the present disclosure relates to a system and method for facilitating peer to peer network distribution in which a setup box will be acting as a seeder.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

A set-top box (STB), also colloquially known as a Cable Box is an information appliance device that generally contains a TV-tuner input and displays output to a television set and an external source of signal, turning the source signal into content in a form that can then be displayed on the television screen or other display device. While BitTorrent/Torrent is a peer-to-peer computer program developed by Bram Cohen and BitTorrent, Inc. that is used for uploading and downloading files via the BitTorrent protocol. In the BitTorrent file distribution system, a torrent file or METAINFO is a computer file that contains metadata about files and folders to be distributed, and usually also a list of the network locations of trackers, which are computers that help participants in the system find each other and form efficient distribution groups called swarms. Usually in torrent based network there may be three types of nodes or peers which are Seeders, Peers and Leechers. In computing, and specifically peer-to-peer file sharing, seeding is uploading of an already downloaded content for others to download from. A peer, a computer that is connected to the network, becomes a seed when having acquired the entire set of data, it begins to offer its upload bandwidth to other peers attempting to download the file. This data consists of small parts so that seeds can effectively share the content with other peers, handing out the missing pieces. A peer deliberately chooses to become a seed by leaving the upload task active once the content has been downloaded. The motivation to seed is mainly to keep the file being shared in circulation (as there is no central hub to continue uploading in the absence of peer or seeders) and a desire to not act as a parasite. The opposite of a seed is a leech, a peer that downloads more than they upload.

The drawbacks of existing platforms for such peer to peer (P2P) network distribution are manifold such as all P2P networks is based on a centralized system, incentives are not aligned with creator of content, hosts engage in rent-seeking behaviour, opaque and arbitrary rules are on creators, contents are censored, difficulty in discovering content and the like. As the network grows the load on the servers for data disbursement will automatically decreases. Seeders usually in (peer to peer/decentralized networks) will act as a data storage node which will upload and download data from fellow peers. As seeding in a network increases, there comes an issue with data storage capability as the number of seeders in a given network is fixed and limited. Further, as the network grows, by using torrent protocol (more precisely BitTorrent), the load on Network for transferring a huge chunk of data becomes more and more and thus the network gets slower and slower. Moreover, distribution of data cannot be done frequently in a safe and secure manner.

There is therefore a need in the art to provide a system and a method that can facilitate decentralised use of temporary utilities rather than permanent utilities by using limited memory devices like set top boxes (STB) as temporary seeders to reduce load on Network for transferring a huge chunk of data.

OBJECTS OF THE PRESENT DISCLOSURE

Some of the objects of the present disclosure, which at least one embodiment herein satisfies are as listed herein below.

An object of the present disclosure is to provide for a system and method for maintaining set top boxes (STB) as temporary seeders to collect the data initially and using the temporary seeders for data disbursal later when the network grows.

An object of the present disclosure is to provide a system and method for facilitating use of DHT tables for collecting dynamic information of current nodes, and updating dynamically the IPs of set top boxes (STB) by scanning the network for certain duration of time.

An object of the present disclosure is to provide a system and method for facilitating deletion of overflow data from temporary seeders (STB) by checking the memory information from time to time.

An object of the present disclosure is to provide a system and method for incentivizing the user depending on memory provided by STB owner by monitoring data disbursal done.

An object of the present disclosure is to provide a system and method for facilitating STBs to be used as seeders and publishers depending on the network size and facilitating a centralized gateway for monitoring the seeders which act as seeders or publishers.

An object of the present disclosure is to provide a system and method for enabling collaboration of permanent seeders (any machines in cloud) and temporary seeder (STBs in the network) to handle the network and reduce dependency.

An object of the present disclosure is to provide a system and method for facilitating authorities to handle the flow of network and content by blocking the expired videos as STBs alone cannot transfer data from one STB to another.

An object of the present disclosure is to provide a system and method for facilitating a dynamic way for using temporary resources instead of using stubborn static networks.

An object of the present disclosure is to provide a system and method for facilitating clear network monitoring of STBs to enhance user experience.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present disclosure provides a system and method for accessing content stored in a network. The system may include a processor that executes a set of executable instructions stored in a memory, upon execution of which, the processor causes the system to receive, from a user set top box, a first set of signals pertaining to a request, the request being received for accessing a specific content from a content repository having one or more contents stored in one or more seeders. The request may include a unique hash value corresponding to the specific content. The processor may cause the system to identify, by an ML engine, one or more first seeders from the one or more seeders containing the specific content based on the unique hash value. The one or more seeders may be identified by matching the unique hash value with pre-stored hash values, and transmit, to the user set top box, a second set of signals pertaining to response to one or more second seeders. The second set of signals may facilitate access of the specific content from the one or more second seeders.

In an embodiment, the network may include one or more first seeders operatively coupled with the one or more second seeders.

In an embodiment, the response may include internet protocol (IP) address of the at least one seeder.

In an embodiment, the user set top box may be operatively coupled with the system through a server.

In an embodiment, the server may be configured to receive a third set of signals, from a creator portal coupled to the ML engine, pertaining to a request for adding the one or more contents to the network, and in response to the third set of signals, the server may be configured to add the one or more contents, for a first time period, to the one or more seeders.

In an embodiment, the one or more seeders may be configured to download the one or more contents from one or more first seeders such that the one or more contents may be available at one or more second seeders even after the first time period.

In an embodiment, the one or more second seeders may be configured to download the one or more contents from the one or more first seeders using torrent protocol.

In an embodiment, the one or more second seeders may be associated with a respective score value generated based on a respective historical data, and the one or more second seeders may be configured to download the one or more contents on the basis of the respective score value.

In an embodiment, the one or more second seeders may be operatively configured with each other such that the one or more contents stored in any of the one or more second seeder may be available to each of the one or more second seeders.

In an embodiment, the system may be configured to update the database every time the system sends the second set of signals.

The present disclosure further provides for the method for facilitating accessing a content stored in a network. In an aspect, the method may include the step of receiving, from a user set top box, a first set of signals pertaining to a request, the request being received for accessing a specific content from a content repository having one or more contents stored in one or more seeders, and the request may include a unique hash value corresponding to said specific content. Further, the method may include the step of identifying, by an ML engine, one or more first seeders from the one or more seeders containing the specific content based on the unique hash value, where the one or more first seeders may be identified by matching the unique hash value with pre-stored hash values. Furthermore, the method may include the step of transmitting, to the user set top box, a second set of signals pertaining to response to one or more second seeders. The second set of signals may facilitate access of the content from the one or more second seeders.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 7B illustrates an exemplary representation of a Hash Table, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust and effective solution to an entity or an organization by enabling a plurality of set top boxes (STBs) to be used as seeders for peer to peer network distribution of data. The plurality of STBs may be used to utilize the Internet for downloading content of the network along with streaming of the content. After downloading the content by the STB by following a predefined set instructions, the STB may provide the downloaded content to the network. After a predefined time, the STB data would not be able to transfer data via internet because API sever coupled to the STB may automatically stop accepting incoming connections to download from other STBs associated with the network.

Figure 1:
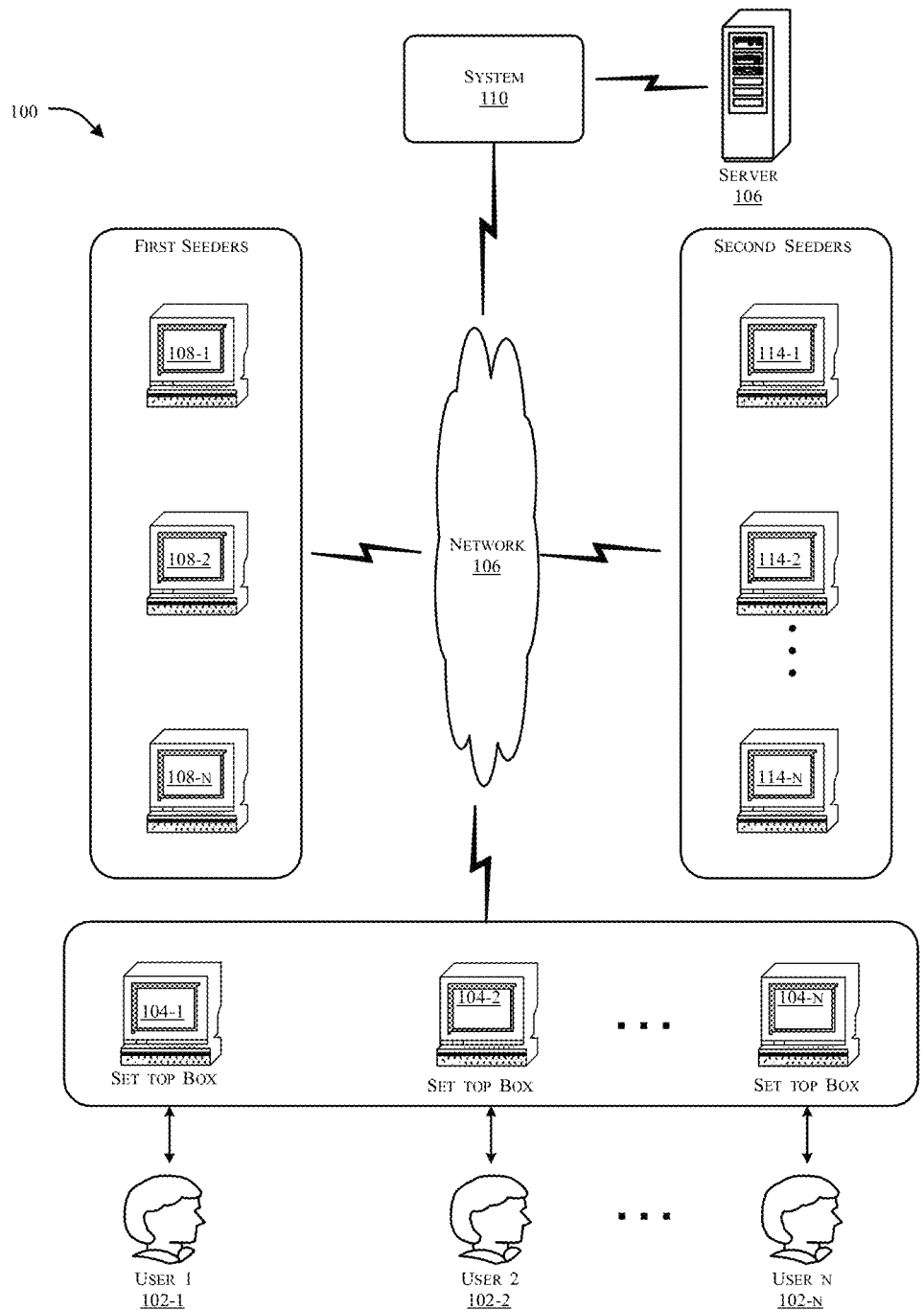
FIG. 1 illustrates an exemplary network architecture in which or with which the system of the present disclosure can be implemented for accessing a content stored in a network in accordance with an embodiment of the present disclosure.

Referring to FIG. 1 that illustrates an exemplary network architecture (100) in which or with which system (110) of the present disclosure can be implemented, in accordance with an embodiment of the present disclosure. As illustrated, the exemplary architecture (100) includes a system (110) equipped with a machine learning engine (214) for accessing a content stored in a network. The system (110) may further receive a first set of signals pertaining to a request from a user set top box (104) associated with a user (102) (also referred collectively as set top boxes 104 or STBs 104 and individually to as set top box 104 or STB 104). The request may be received for accessing a specific content from a content repository having one or more contents stored in one or more seeders. The request may include a unique hash value corresponding to the specific content. The ML engine (214) may further cause the system (110) to identify, one or more first seeders (108-1, 108-2 . . . 108-N) (interchangeably referred to as permanent seeders (404) (Ref. FIG. 4) from the one or more seeders containing the specific content based on the unique hash value. The one or more first seeders may be referred collectively as first seeders 108 and individually as first seeder (108). The one or more seeders may be identified by matching the unique hash value with pre-stored hash values. The Ml engine (214) may also cause the system (110) to transmit to the user set top box (104), a second set of signals pertaining to response to one or more second seeders (114-1, 114-2 . . . 114-N)(Interchangeably referred to as second seeders 114 or temporary seeders 406 (from FIG. 4). The second set of signals may facilitate access of the specific content from the second seeders (114). The first seeders (108) and the second seeders (114) may be operatively coupled to the system (110) and the centralized server (112) through the network 106.

In an embodiment, the response may include internet protocol (IP) address of the at least one seeder.

In an embodiment, the user set top box (STB 104) may be operatively coupled with the system (110) through the centralized server (112) (interchangeably referred to as the server 112) and the centralised server can be associated with one or more servers such as an Application programming interface (API) server, a distributed hash table (DHT) server and the like.

In an embodiment, the server (112) may be configured to receive a third set of signals, from a creator portal coupled to the ML engine (214), pertaining to a request for adding the one or more contents to the network, and in response to the third set of signals, the server (112) may be configured to add the one or more contents, for a first time period, to the one or more seeders.

In an embodiment, the one or more seeders may be configured to download the one or more contents from the first seeders (108) such that the one or more contents may be available at the second seeders (114) even after the first time period. The second seeders (114) may be configured to download the one or more contents from the first seeders (108) using a predefined protocol such as a torrent protocol but not limited to it.

In an embodiment, the second seeders (114) may be associated with a respective score value generated based on a respective historical data, and the second seeders (114) may be configured to download the one or more contents on the basis of the respective score value. The second seeders (114) may be operatively configured with each other such that the one or more contents stored in any of the second seeder (114) may be available to each of the second seeders (114).

In an embodiment, the system (110) may be configured to update the database every time the system (110) may send the second set of signals.

In an embodiment, the one or more first seeders (108), the one or more second seeders (114) and the STBs (104) may communicate with the system (110) via a set of executable instructions residing on any operating system, including but not limited to, Android™, iOS™, Kai OS™ and the like. In an embodiment, the one or more first seeders (108), the one or more second seeders (114) and the STBs (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. A set-top box (STB, interchangeably referred to as a cable box) may be an information appliance device that may generally contain a TV-tuner input but not limited to it and may display output to a television set but not limited to it and an external source of signal, turning the source signal into a content in a form that can then be displayed on the television screen or other display device. It may be appreciated that the one or more first seeders (108), the one or more second seeders (114) and the STBs (104) may not be restricted to the mentioned devices and various other devices may be used. A smart computing device may be one of the appropriate systems for storing data and other private/sensitive information.

The network (106) may be but not limited to a Peer-to-Peer network (interchangeably referred to as P2P network or computer-to-computer network). For example, 'Peers' may be nodes or computer systems which may be connected to each other. In this kind of network, each node may be connected to each other node in the network. The nodes can share printers or CDROM drives, and allow other devices to read or write to its hard disk, allowing sharing of files, access to internet connection, and other resources. Files or resources can be shared directly between the systems on the network, without the need of any central server. P2P network may allow nodes to become a server and share things. In a peer-to-peer network, each node can work as either a server as well as a client. The network may not distinguish between the client and server. Each of the nodes can act as both client/server depending on whether the node is requesting or providing the service. All the nodes may be functionally equal and can send or receive data directly with one another. Peer-to-Peer networks can be deployed very easily with most modern Operating Systems such as Windows and Mac O.S., and the like. Computers in the peer-to-peer network run on the same network protocols and software. Once connected to the network, P2P software may allow users to search for files and other resources on some other node. The pattern of communication between peers may depend entirely on the application requirement. Each object may be replicated in several computers to further distribute the load and to provide flexibility in the event of disconnection of the individual computer. A peer-to-peer network can be configured as both wired as well as a wireless network. It is most commonly used in the Local Area Network, especially in small offices, or within a single department of a large organization. The nodes present in the network may be situated very near to each other. Each node may have access to devices and files on other computers and can store independently its own software and information. For Example, BitTorrent but not limited to it is a widely used peer-to-peer network.

Figure 2:
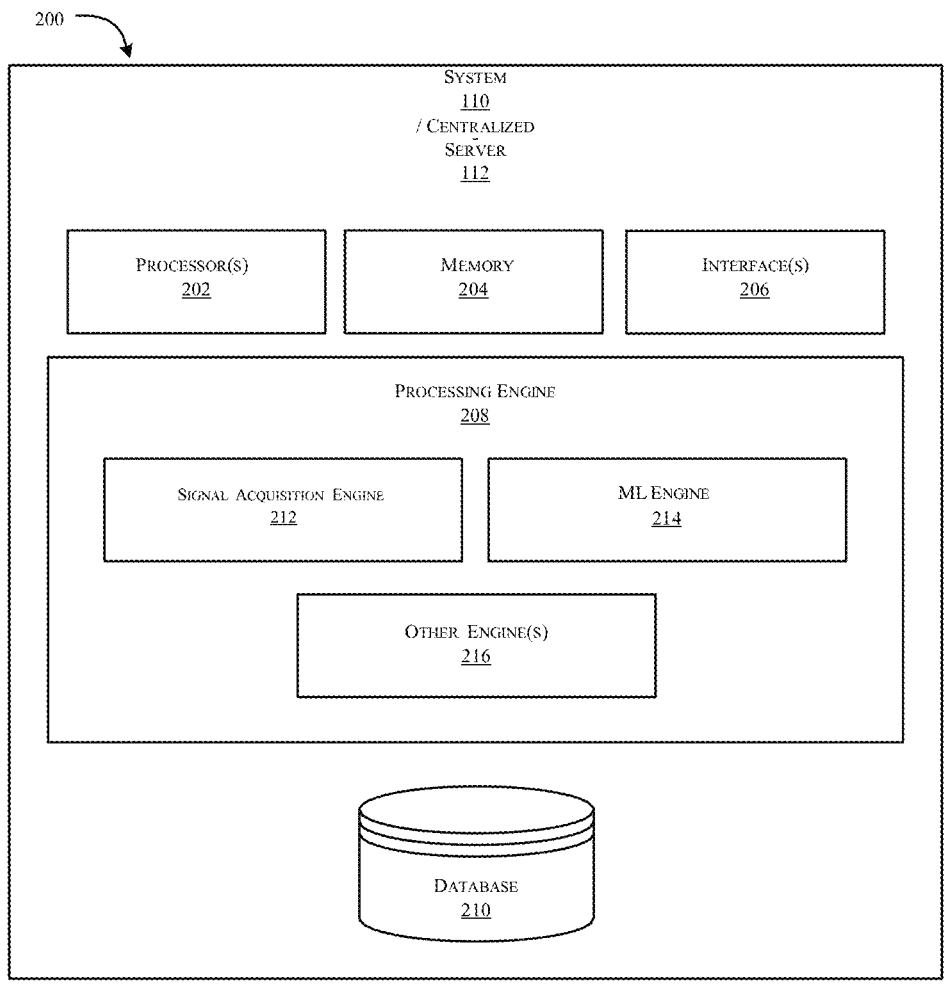
FIG. 2 illustrates an exemplary representation of a system or a centralized server for accessing a content stored in a network, in accordance with an embodiment of the present disclosure.

In an embodiment, the system (110) or the centralized server (112) may include one or more processors coupled with a memory, wherein the memory may store instructions which when executed by the one or more processors may cause the system to access content stored in a network. FIG. 2 with reference to FIG. 1, illustrates an exemplary representation of system (110)/centralized server (112) for accessing content stored in a network, in accordance with an embodiment of the present disclosure. In an aspect, the system (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110)/centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the system (110). The interface(s) 206 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a signal acquisition engine (212), a machine learning (ML) engine (214), and other engines (216). In an embodiment, the signal acquisition engine (212) of the system (110) can receive, from a user set top box (104), a first set of signals pertaining to a request being received for accessing a specific content from a content repository having one or more contents stored in one or more seeders. The request may include a unique hash value corresponding to the specific content.

The ML engine (214) may be configured to identify one or more first seeders from the one or more seeders containing the specific content based on the unique hash value, and the one or more seeders may be identified by matching the unique hash value with pre-stored hash values. The ML engine (214) may be further configured to transmit to the user set top box (104), a second set of signals pertaining to response to one or more second seeders (114). The second set of signals may facilitate access of the specific content from the one or more second seeders (114).

In an embodiment, a creator portal associated with a centralised server 112 may be coupled to the ML engine (214). The creator portal may receive a third set of signals pertaining to a request for adding the one or more contents to the network, and in response to the third set of signals, the server may be configured to add the one or more contents, for a first time period, to the one or more seeders.

In an embodiment, the ML engine (214) may facilitate the one or more seeders to download the one or more contents from one or more first seeders such that the one or more contents may be available at one or more second seeders even after the first time period.

The ML engine (214) may facilitate the one or more second seeders (114) to download the one or more contents from the one or more first seeders using torrent protocol. The one or more second seeders may be associated with a respective score value generated by the ML engine (214) based on a respective historical data, and the one or more second seeders may be configured to download the one or more contents on the basis of the respective score value. The ML engine (214) may enable the one or more second seeders such that the one or more contents stored in any of the one or more second seeder may be available to each of the one or more second seeders and the database may be updated every time the system may send the second set of signals.

Figure 3:
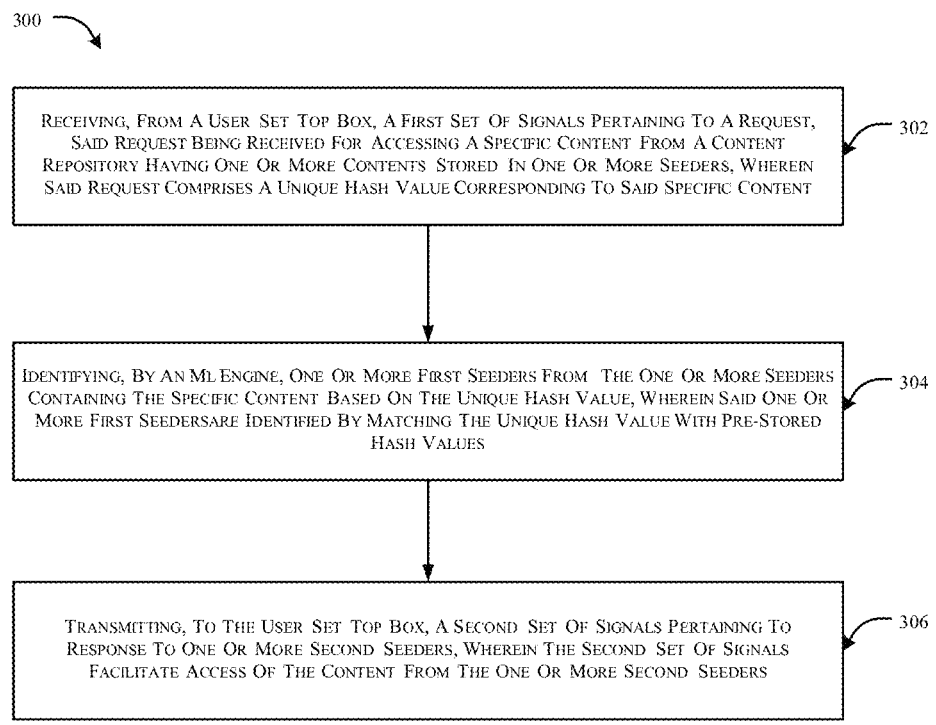
FIG. 3 illustrates an exemplary flow diagram representation of the proposed method enabling accessing a content stored in a network, in accordance with an embodiment of the present disclosure.

FIG. 3 illustrates an exemplary flow diagram representation of the proposed method (300) enabling accessing a content stored in a network, in accordance with an embodiment of the present disclosure.

The present disclosure further provides for the method (300) for facilitating accessing a content stored in a network. The method (300) may include at 302 the step of receiving, from a user set top box, a first set of signals pertaining to a request, the request being received for accessing a specific content from a content repository having one or more contents stored in one or more seeders, and the request may include a unique hash value corresponding to said specific content. Further, the method may include at 304 the step of identifying, by an ML engine, one or more first seeders from the one or more seeders containing the specific content based on the unique hash value, where the one or more first seeders may be identified by matching the unique hash value with pre-stored hash values.

Furthermore, the method may include at 306, the step of transmitting, to the user set top box, a second set of signals pertaining to response to one or more second seeders. The second set of signals may facilitate access of the content from the one or more second seeders.

Figure 4A:
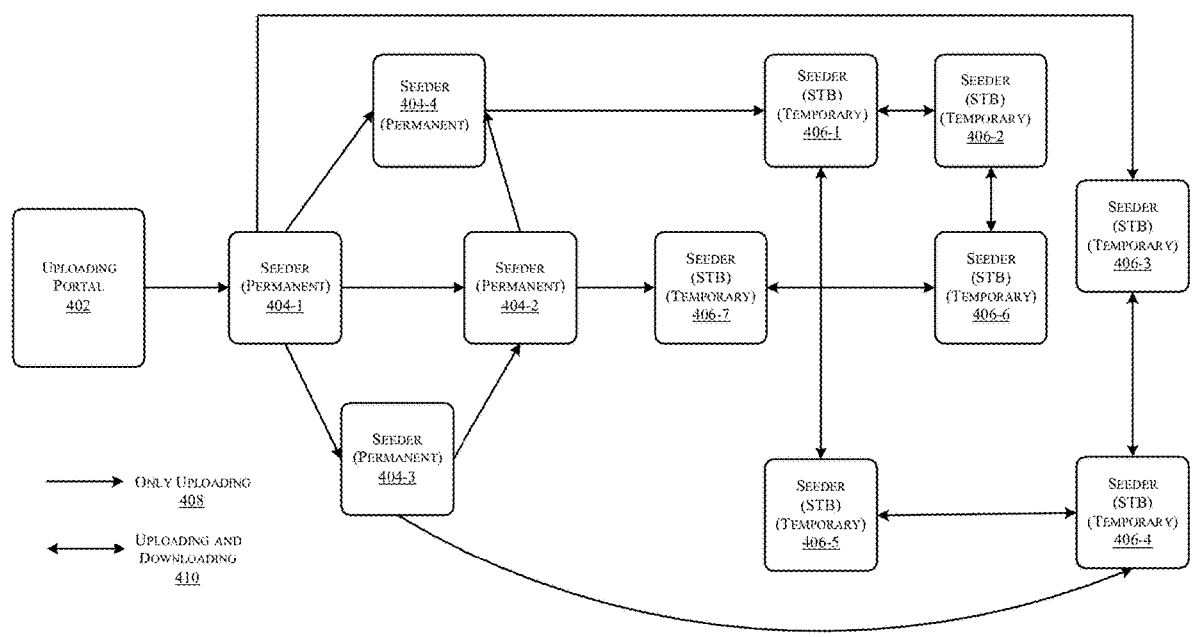
FIG. 4A-4B illustrate exemplary representations depicting components of the system architecture involved in facilitating accessing content stored in a network, in accordance with an embodiment of the present disclosure.
Figure 4B:
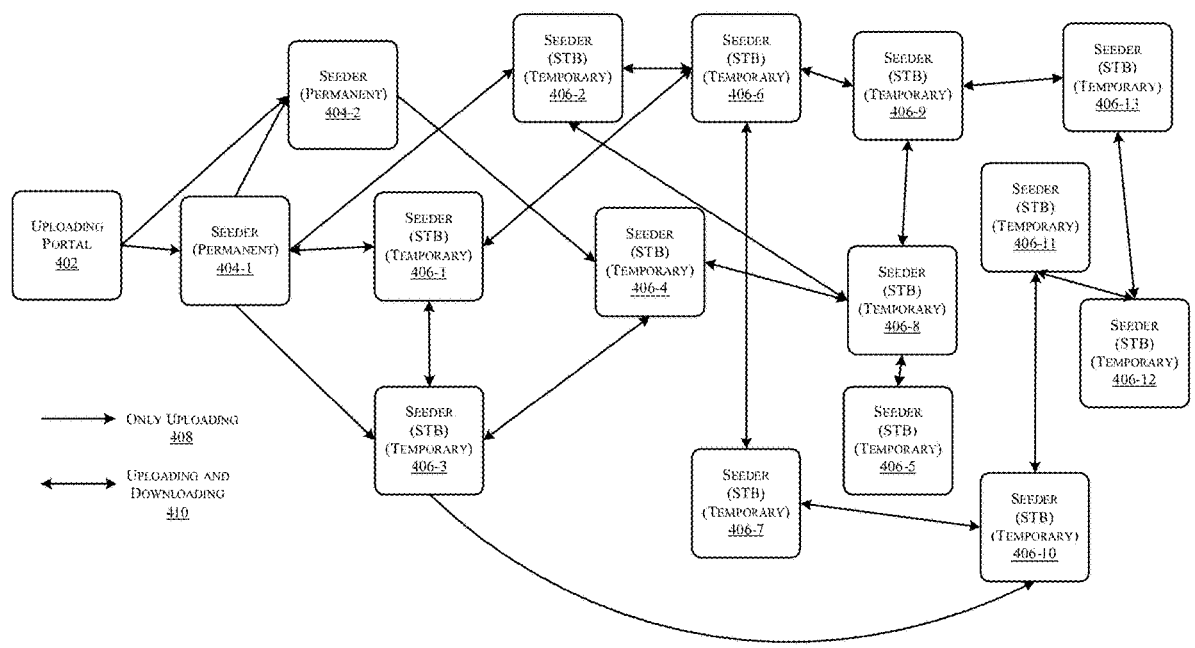

FIG. 4A-4B illustrate exemplary representations depicting components of the system architecture involved in facilitating accessing content stored in a network, in accordance with an embodiment of the present disclosure. FIG. 4A illustrates an exemplary system architecture. The system (400) may include a block 402 an uploading portal that may provide content for downloading 408 by a plurality of first seeders (404) (also referred to as permanent seeders 404-1, 404-2, 404-3 and 404-4). The plurality of permanent seeders 404 may then upload the content such that the plurality of temporary seeders 406 may download from the plurality of permanent seeders 404. A plurality of second seeders 406 (also referred to as temporary seeders 406-1, 406-2, 406-3, 406-4, 406-5, 406-6 and 406-7) may be configured to download contents from the plurality of permanent seeders 404 and uploading the downloaded contents to other temporary seeders 406. The plurality of temporary seeders 406 may be configured both for uploading and downloading 410 contents.

In a way of example, and not as a limitation, considering the scenario of having a network of a plurality of STBs that may act as temporary seeders, a plurality of STBs as permanent seeders 404 controlled by a centralised system. During initial days, uploading server may upload content pertaining to a plurality of videos in the uploading portal 402. The content may be automatically downloaded by a plurality of permanent seeders 404 and a plurality of temporary seeders 406 may download the content from the plurality of permanent seeders 404 by using torrent mechanism by interacting with the uploading server and TCP data transfer but not limited to the like. After a first predefined time every STB may download the content locally and no internet connection may be needed for streaming. Again, after a second predefined time for example 24 hrs, the content may be deleted from the permanent seeders 404. The content may remain but since connections for that content may not be used, the users of STB can only manually transfer the content using hard drives and not via internet. After a third predefined time (for example a few days) as the network may grow as illustrated in FIG. 4B, uploading and downloading speed may automatically increase according to the core principles of torrent. Hence the number of permanent seeders 404-1 and 404-2 may be decreased if required and thereby the number of input-output based operations may also decrease while the number of temporary seeders 406-1, 406-2, 406-3 . . . 406-10 may increase.

As for the loyal temporary seeders pertaining to seeders for active for more than a threshold predefined time, data charges may be compensated by providing some rewards using some crypto tokens or coupons.

Figure 5:
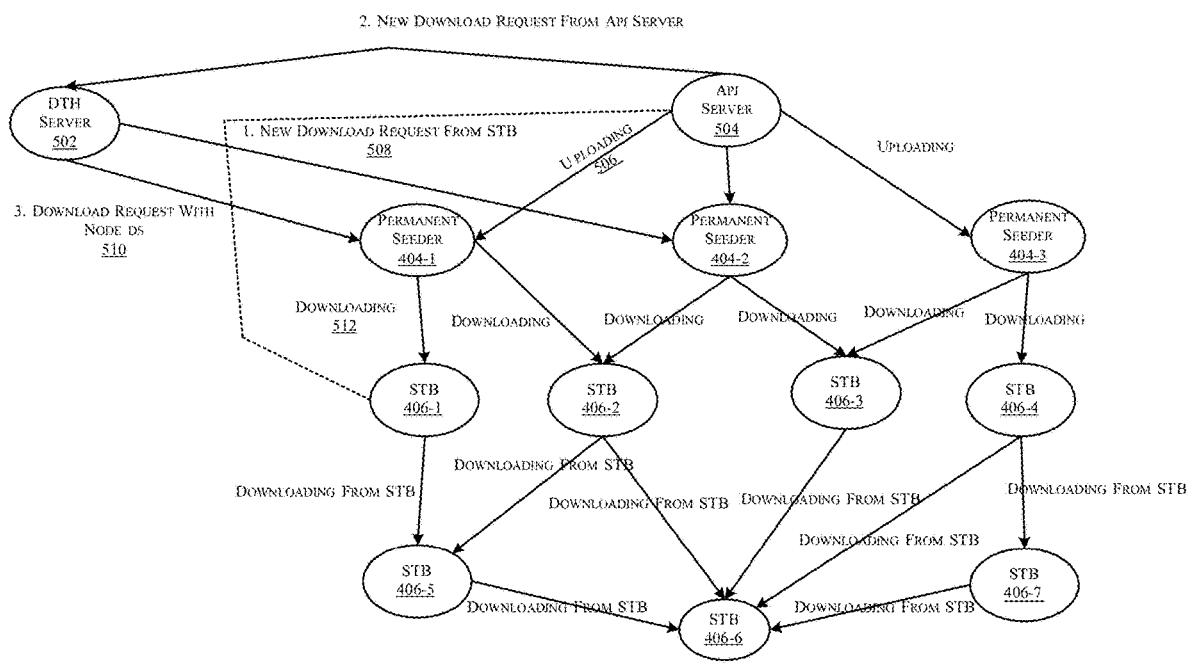
FIG. 5 illustrates an exemplary representation of an internal network architecture (500), in accordance with an embodiment of the present disclosure.

FIG. 5 illustrates an exemplary representation of an internal network architecture (500), in accordance with an embodiment of the present disclosure.

As illustrated in FIG. 5, the internal network architecture (500) may include a first server such as but not limited to an API Server (504) (Also referred to as Uploading Server 504) that may accept incoming requests from a second server such as but not limited to a distributed hash table (DHT) Server (502) and temporary seeders (406) (also equivalently referred to as STBs 406), and may send back the response, manipulate data, validates requests and the data but not limited to the like. In an exemplary embodiment, the API Server (504) and the DHT Server (502) may be coupled to the centralized server (112) or may be a part of the centralized server (112). In an embodiment, if a new request comes from API server (514) to the DHT Server (502) to download the data, the DHT Server (502) may provide a list of nodes available and data storage locations according to movie metadata and hashes as illustrated in FIG. 5. Downloading functionality may happen from the DHT server (502) to temporary seeders (406). In an embodiment, the temporary Seeders (406) may be standard STBs acting as data storage for the data. The data present in the temporary seeders (406) may not be able to be distributed after the first predefined time because the API server (504) may not accept request to play via internet. If the data is stored locally, then the data can be played. In an embodiment, the permanent Seeders (404) may be a cluster of data storage maintained by a system for initial data storage. In an exemplary implementation, at step 508 new download request from the STB (404) to the API Server (504) while at step 514 API server (504) may fetch information to permanent seeders (404) and may send the movie id and nodes information to the DHT server (502). At step 510, DHT server (502) may receive request and STB Node id along with permanent node ids and may be used for downloading the content to requested node.

Figure 6:
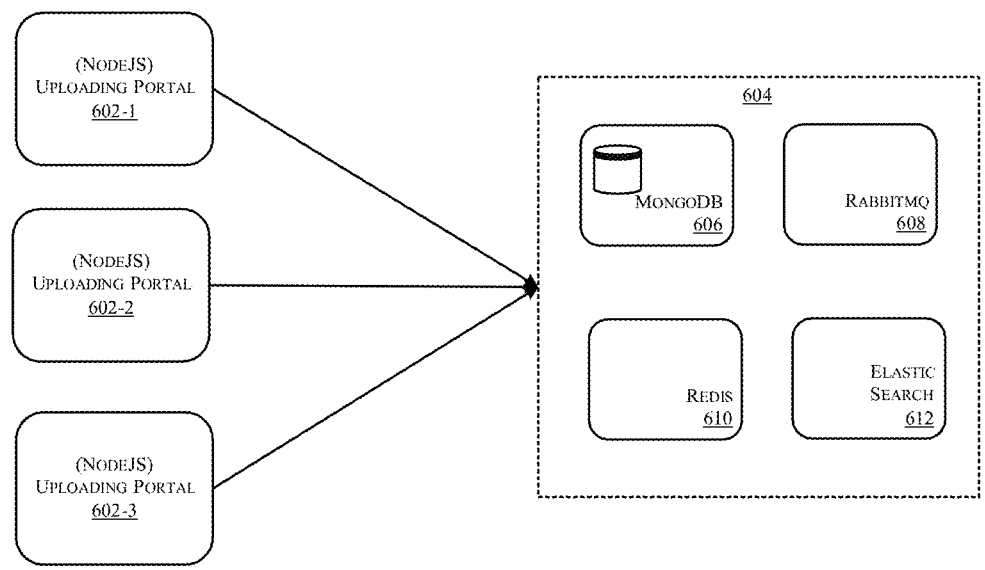
FIG. 6 illustrates an exemplary representation of a flow diagram of the uploading portal in accordance with an embodiment of the present disclosure.

FIG. 6 illustrates an exemplary representation of a flow diagram of the uploading portal in accordance with an embodiment of the present disclosure.

As illustrated in FIG. 6, in an aspect, the uploading portal 602 for at least three nodes such as 602-1, 602-2 and 602-3. The uploading portal 602 of the API server can be used for getting an incoming request and sending a response corresponding to the incoming request. The uploading portal for the at least three nodes 602-1, 602-2 and 602-3 may be connected to a third party system 604 for better user utility.

Figure 7A:
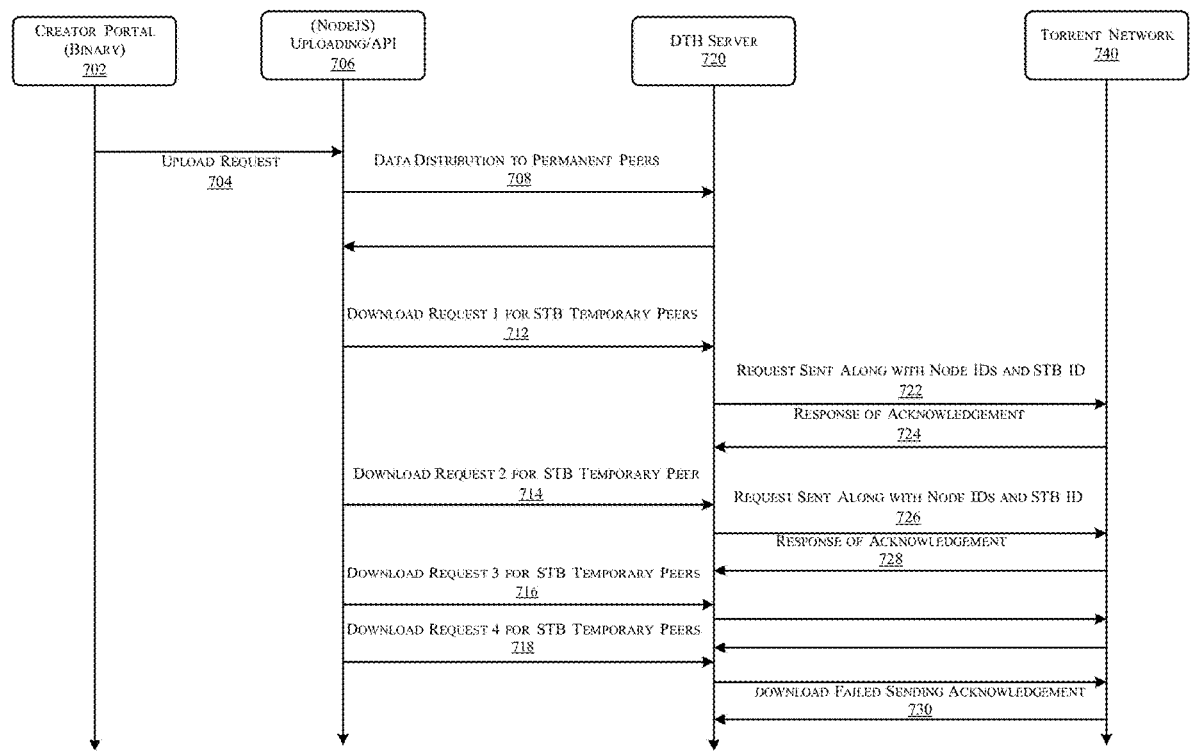
FIG. 7A illustrates an exemplary representation of uploading and downloading request-response flows, in accordance with an embodiment of the present disclosure.

FIG. 7A illustrates an exemplary representation of uploading and downloading request-response flows, in accordance with an embodiment of the present disclosure.

As illustrated, in an aspect, at block 704, the uploading portal or the API server may get an upload video request (704) for uploading the video from a creator portal at block 702. The uploading portal or the API server at block 704 may send data distribution to permanent peers 708 to DHT server at block 720. The DHT server at block 720 then may send acknowledgement with node ids (710) to the API server at block 704. The API server at block 704 may then send download request 1 for STB temporary peers (712) to DHT server at block 720. The DHT server at block 720 may send request along with node ids and STB id (722) to a Torrent network at block 740. The Torrent network at block 740 may acknowledge the request with a response (724) to the DHT server at block 720. The API server at block 704 may another send download request 2 for STB temporary peers (714) to DHT server at block 720. The DHT server at block 720 may send request along with node ids and STB id (726) to the Torrent network at block 740. The Torrent network at block 740 may acknowledge the request with a response (728) to the DHT server at block 720. The API server at block 704 may further send download request 3 for STB temporary peers (716) to DHT server at block 720. But the Torrent network at block 740 may fail to respond. The API server at block 704 may further send download request 4 for STB temporary peers (718) to the DHT server at block 720. After a predefined interval of time the Torrent network at block 740 may send download failed acknowledgement (730) to the DHT server at block 720.

In an embodiment, a creator portal may invoke an uploading request. The API Server may receive the request and may fetch a list of permanent seeders to start uploading data to the permanent seeders. The API Server receives response from Permanent seeders as Acknowledgements. The API Server may further update a database and may invoke the DHT server for data transfer and updation of a plurality of DHT tables.

In an embodiment, the DHT server may help a Torrent based Network that may include a plurality of temporary seeders but not limited to it, for downloading the content. A plurality of predefined first set of peers may be given more preference than a plurality of predefined second set of peers. After downloading the content, the DHT Table may be updated based on the acknowledgement received. If a new download request comes from a new STB, the method may be repeated and the DHT tables may contain more nodes that may increase downloading and uploading speed.

FIG. 7B illustrates an exemplary representation of a Hash Table, in accordance with an embodiment of the present disclosure.

As illustrated, in a way of example and not as a limitation, each movie may be identified using movie id and data (complete or divided) may be hashed to produce a hash id. Node Ids may be attached to a corresponding content and may indicate the location of data. As illustrated in FIG. 7B, first, second, third and fourth row of the hash table shows a hash with movie id with corresponding IPs and can be considered as permanent seeders. Fifth, sixth, seventh and eighth row can be considered as temporary seeders where data may be hashed and where data may be allocated to corresponding nodes.

In an embodiment, if a new request comes, the data from a plurality of nodes that may include permanent and temporary seeders may be considered for data download. In yet another embodiment, if the acknowledgment from temporary seeder returns error, the DHT Tables may not be updated and downloading may again be invoked from the DHT server to download data and update the DHT Table.

Figure 8A:
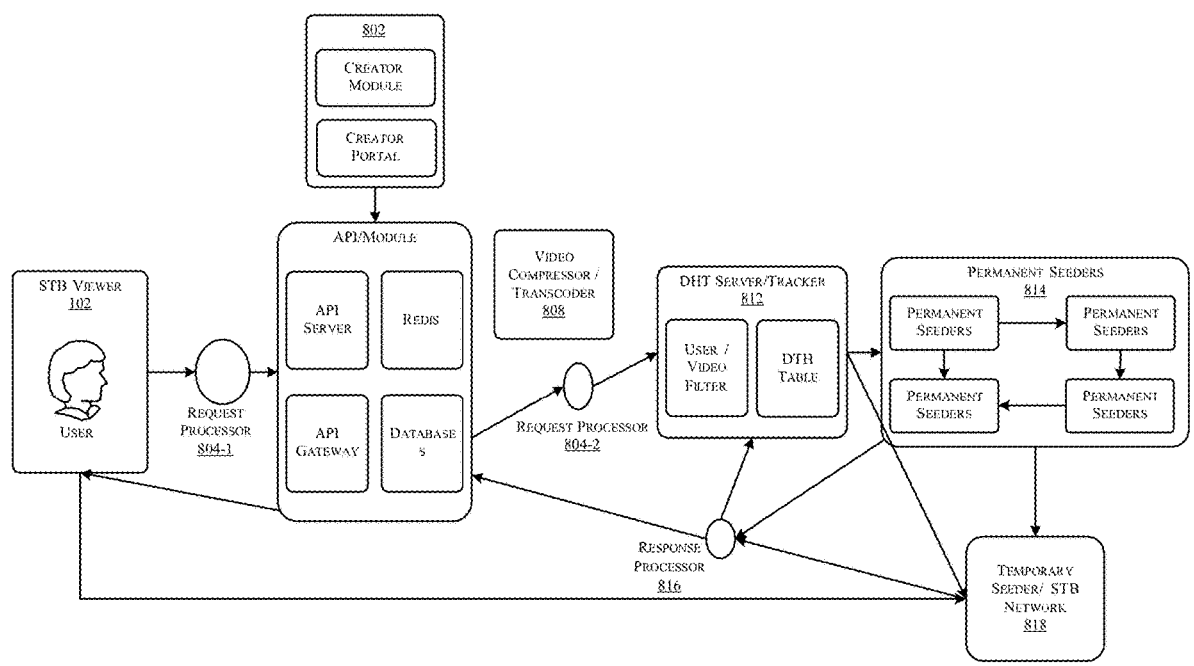
FIG. 8A-8B illustrate exemplary representations of a system architecture in accordance with an embodiment of the present disclosure.
Figure 8B:
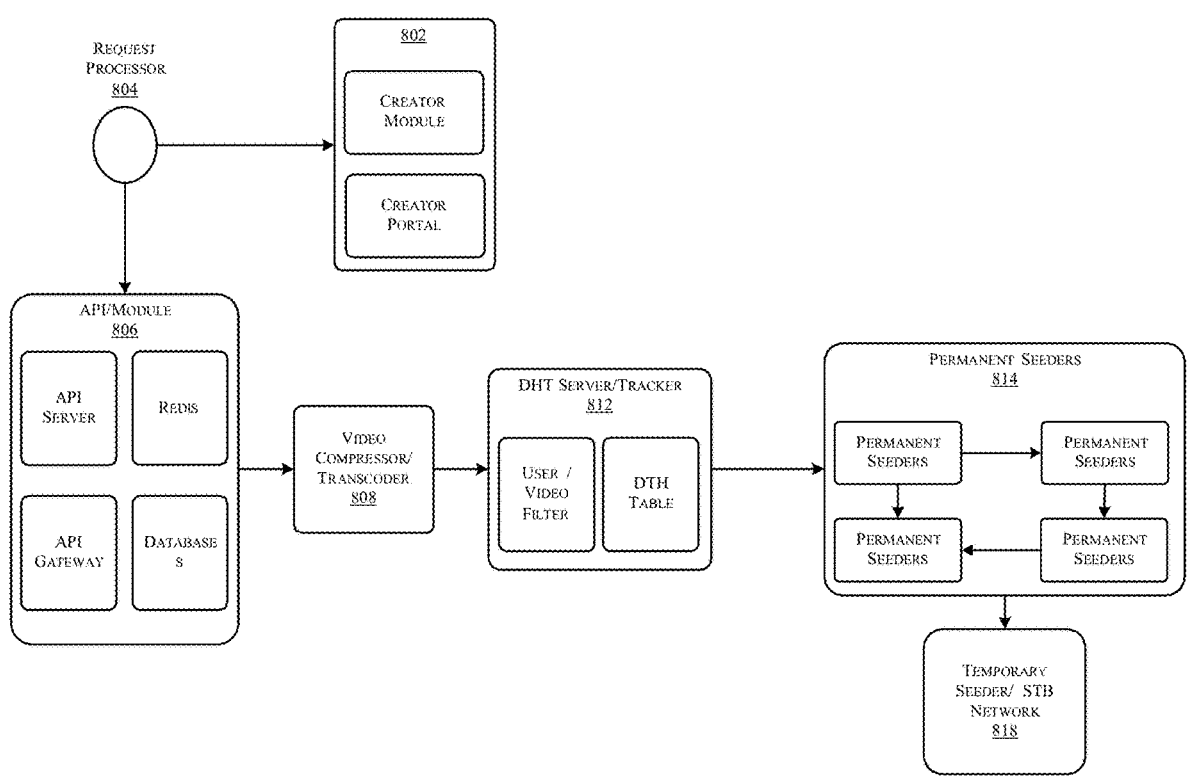

FIG. 8A-8B illustrate exemplary representations of a system architecture in accordance with an embodiment of the present disclosure.

As illustrated in FIG. 8A, Watch Request may be sent from a creator module (802) that may include a creator portal to an API module (806) that may include an API server, an API gateway, a plurality of databases coupled to the server and the like. The Watch Request may be processed through a request processor (804-2) and attached to a user and video filter for Torrent Nodes and a DHT Table of a DHT Server/Tracker module (812). Depending on the DHT table result data may be fetched from any or a combination of a plurality of temporary seeders (818) and a plurality of permanent Seeders (814). A Response to the watch request may be sent back to the API Server (806) through a response processor (816) to relay and connect to the DHT server (812) for updating the DHT Table. The API Server (806) may send a download request to STB along with a filtered seeders information. An STB User (102) may join the Torrent network until the video may be downloaded and may be left with option to continue with torrent network or not through a request processor (804-1).

As illustrated in FIG. 8B, a new media may be uploaded using the creator portal of the creator module (802). The new media may be sent to a video transcoder or compressor (808) for a plurality of versions and copies of a file corresponding to the new media. The new compressed videos corresponding to the new media may be sent to the user and video filters and DHT table of the DHT server/tracker (812) for further filtrations and may be updated by the permanent seeders (818). The Permanent seeders (818) may download the data and store a plurality of copies of the new media uploaded and may send a plurality of metadata for the DHT server (812) to update. The API server of the API module (806) may acknowledge and a corresponding database of the API module may be updated.

Figure 9:
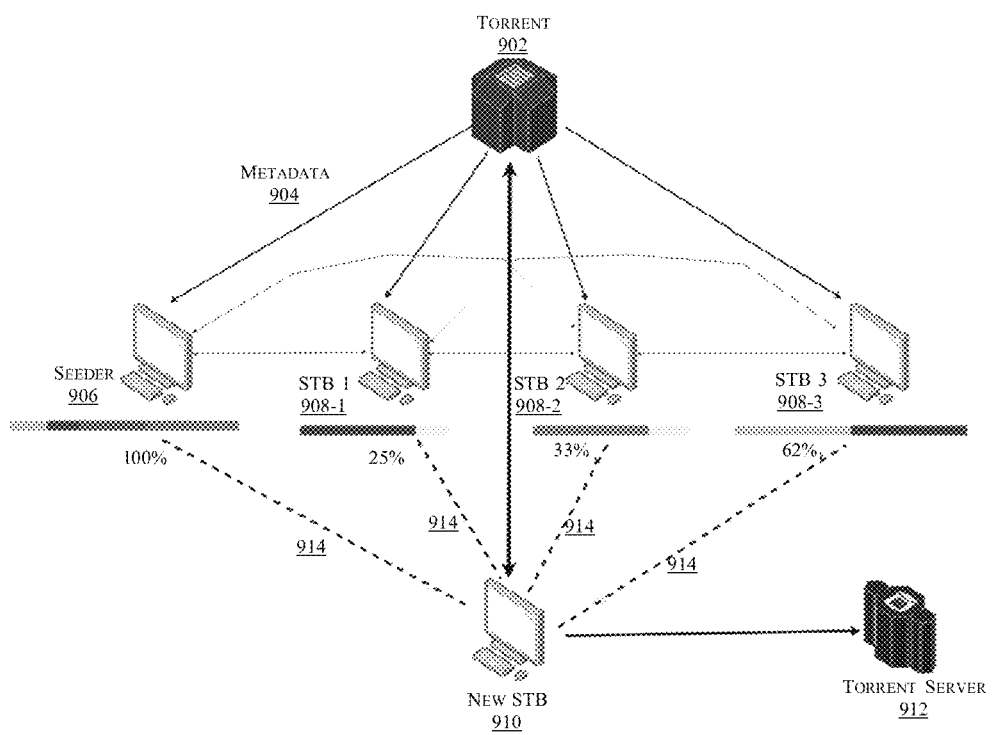
FIG. 9 illustrate an exemplary implementation of the exemplary overview of the functional components of the proposed system in accordance with an embodiment of the present disclosure.

FIG. 9 illustrate an exemplary implementation (900) of the exemplary overview of the functional components of the proposed system in accordance with an embodiment of the present disclosure.

As illustrated, the proposed system can be thus summarised through a system block having components such as Torrent Server (912), Torrent Tracker (902), Seeder (906), STBs (908-1, 908-2, 908-3), New STB (910) but not limited to the like. The Torrent Tracker (902) may keep track of all devices and complete information including metadata (904), media information and part of information in form of hashes. When a the New STB (910) may want to join into the network (900), the New STB (910) may contact the Torrent Server (912) and may ask for media information. The Torrent Server (912) may help the new STB (910) to connect to the Torrent Tracker (902), the new STB (910) may register and connect with the Torrent Tracker (902). After connecting to the Torrent Tracker (902) may give out the media information and the New STB (910) may connect with the Seeders first and subsequently to the STBs (908-1, 908-2, 908-3) which may be volunteered to become a Temporary Seeder (914). After downloading the STB can act as Temporary Seeder or may get out of the network. Depending on the frequency of the STB acting as seeder, the STB may be given priorities, preference, loyalty points and the like.

Figure 10:
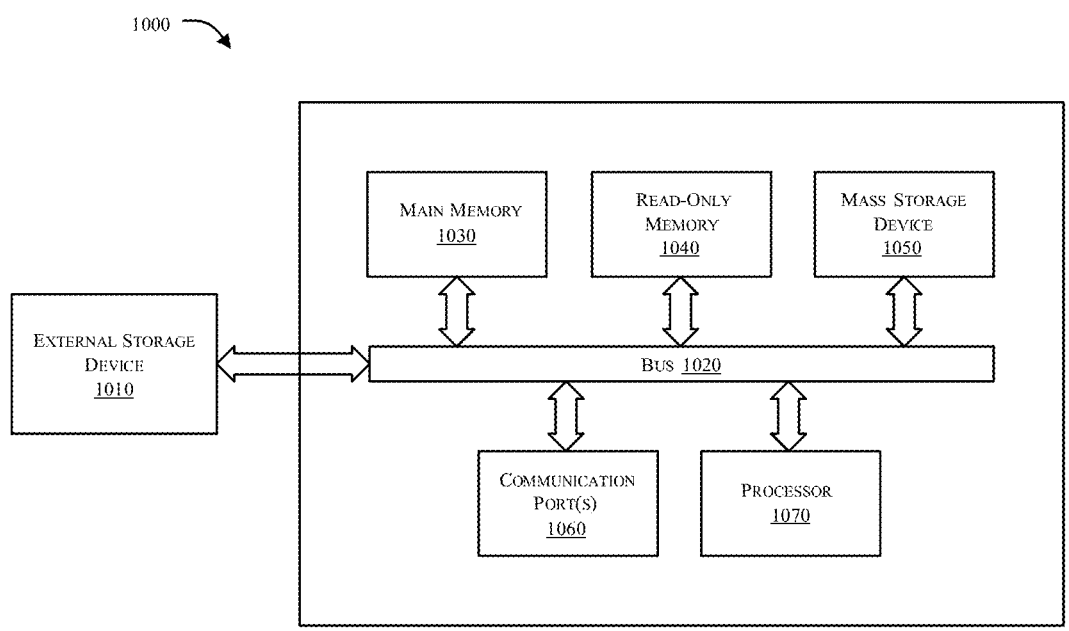
FIG. 10 illustrates an exemplary computer system in which or with which embodiments of the present invention can be utilized in accordance with embodiments of the present disclosure.

FIG. 10 illustrates an exemplary computer system in which or with which embodiments of the present invention can be utilized in accordance with embodiments of the present disclosure. As shown in FIG. 10, computer system 1000 can include an external storage device 1010, a bus 1020, a main memory 1030, a read only memory 1040, a mass storage device 1050, communication port 1060, and a processor 1070. A person skilled in the art will appreciate that the computer system may include more than one processor and communication ports. Examples of processor 1070 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 1070 may include various modules associated with embodiments of the present invention. Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects. Memory 1030 can be Random Access Memory (RAM), or any other dynamic storage device commonly known in the art. Read-only memory 1040 can be any static storage device(s) e.g., but not limited to, a Programmable Read Only Memory (PROM) chips for storing static information e.g., start-up or BIOS instructions for processor 1070. Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 7K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g. a display, keyboard, and a cursor control device, may also be coupled to bus 1020 to support direct operator interaction with a computer system. Other operator and administrative interfaces can be provided through network connections connected through communication port 1060. The external storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and method to facilitate decentralized Peer to Peer systems in many levels, no interference in the network that may include STBs and Permanent seeders and data storage in plurality of levels.

The present disclosure provides for a system and method to facilitate decrease in load in API server such that the API server can directly transfer to peers while downloading and smoothly control traffic with less payload for every request.

The present disclosure provides for a system and method facilitates optimal utilization of torrent technology, as the network grows and uploading and downloading increases The present disclosure provides for a system and method facilitates maintaining of set top boxes (STB) as temporary seeders to collect the data initially and using the temporary seeders for data disbursal later when the network grows.

The present disclosure provides for a system and method facilitates use of DHT tables for collecting dynamic information of current nodes, and updating dynamically the IPs of set top boxes (STB) by scanning the network for certain duration of time.

The present disclosure provides for a system and method facilitates deletion of overflow data from temporary seeders (STB) by checking the memory information from time to time.

The present disclosure provides for a system and method facilitates Incentivizing the user depending on memory provided by STB owner by monitoring data disbursal done.

The present disclosure provides for a system and method facilitates STBs to be used as seeders and publishers depending on the network size and facilitating a centralized gateway for monitoring the seeders which act as seeders or publishers.

The present disclosure provides for a system and method facilitates collaboration of permanent seeders (any machines in cloud) and temporary seeder (STBs in the network) to handle the network and reduce dependency.

The present disclosure provides for a system and method facilitates authorities to handle the flow of network and content by blocking the expired videos as STBs alone cannot transfer data from one STB to another.

The present disclosure provides for a system and method facilitates a dynamic way for using temporary resources instead of using stubborn static networks.

The present disclosure provides for a system and method facilitates clear network monitoring of STBs to enhance user experience.

We claim:

1. A system for accessing content stored in a network, said system comprising a processor that executes a set of executable instructions stored in a memory, upon execution of which, the processor causes the system to:
   receive, from a user set top box, a first set of signals pertaining to a request, said request being received for accessing a specific content from a content repository having one or more contents stored in one or more seeders, wherein said request comprises a unique hash value corresponding to said specific content;
   identify, by a machine learning (ML) engine, one or more first seeders from the one or more seeders containing the specific content based on the unique hash value, wherein said one or more first seeders are identified by matching the unique hash value with pre-stored hash values; and
   transmit, to the user set top box, a second set of signals pertaining to response to one or more second seeders, wherein the second set of signals facilitate access of the specific content to the user set top box from said one or more second seeders within a first predefined time period, wherein after the first predefined time period, a server connected to the user set top box stops accepting a download request for accessing the specific content available at the one or more second seeders, wherein, upon ending of the first predefined time period, a second predefined time period starts, and after the second predefined period, the specific content is deleted from the one or more first seeders and is remained in the one or more second seeders, and wherein the one or more first seeders are permanent seeders and the one or more second seeders are temporary seeders associated with the predefined first time period and the predefined second time period.

2. The system as claimed in claim 1, wherein the network comprises said one or more first seeders operatively coupled with said one or more second seeders.

3. The system as claimed in claim 1, wherein the response comprises internet protocol (IP) address of the at least one seeder.

4. The system as claimed in claim 1, wherein the server is configured to receive a third set of signals, from a creator portal coupled to the ML engine, pertaining to a request for adding the one or more contents to the network, and in response to the third set of signals, the server is configured to add the one or more contents to the one or more seeders.

5. The system as claimed in claim 4, wherein the one or more second seeders are configured to download the one or more contents from the one or more first seeders such that the one or more contents are available at the one or more second seeders.

6. The system as claimed in claim 5, wherein the one or more second seeders are configured to download the one or more contents from the one or more first seeders using a predefined protocol.

7. The system as claimed in claim 6, wherein the one or more second seeders are associated with a respective score value generated based on a respective historical data, and the one or more second seeders are configured to download the one or more contents on the basis of the respective score value.

8. The system as claimed in the claim 7, wherein the one or more second seeders are operatively configured with each other such that the one or more contents stored in any of the one or more second seeders are available to each of the one or more second seeders.

9. The system as claimed in claim 1, the system is configured to update the database every time the system sends the second set of signals.

10. A method for accessing a content stored in a network, said method comprising
    receiving, from a user set top box, a first set of signals pertaining to a request, said request being received for accessing a specific content from a content repository having one or more contents stored in one or more seeders, wherein said request comprises a unique hash value corresponding to said specific content;
    identifying, by a machine learning (ML) engine, one or more first seeders from the one or more seeders containing the specific content based on the unique hash value, wherein said one or more first seeders are identified by matching the unique hash value with pre-stored hash values; and
    transmitting, to the user set top box, a second set of signals pertaining to response to one or more second seeders, wherein the second set of signals facilitate access of the content from the one or more second seeders within a first predefined time period, wherein after the first predefined time period, a server connected to the user set top box stops accepting a download request for accessing the specific content available at the one or more second seeders, wherein, upon ending of the first predefined time period, a second predefined time period starts, and after the second predefined period, the specific content is deleted from the one or more first seeders and is remained in the one or more second seeders, and wherein the one or more first seeders are permanent seeders and the one or more second seeders are temporary seeders associated with the predefined first time period and the predefined second time period.

11. The method as claimed in claim 10, wherein the network comprises said one or more first seeders operatively coupled to said one or more second seeders.

12. The method as claimed in claim 10, wherein the response comprises internet protocol (IP) address of the at least one seeder.

13. The method as claimed in claim 10, wherein the server is configured to receive a third set of signals, from a creator portal coupled to the ML engine, pertaining to a request for adding the one or more contents to the network, and in response to the third set of signals, the server is configured to add the one or more contents to the one or more seeders.

14. The method as claimed in claim 13, wherein the one or more second seeders are configured to download the one or more contents from the one or more first seeders such that the one or more contents are available at the one or more second seeders.

15. The method as claimed in claim 14, wherein the one or more second seeders are configured to download the one or more contents from the one or more first seeders using a predefined protocol.

16. The method as claimed in claim 15, wherein the one or more second seeders are associated with a respective score value generated based on a respective historical data, and the one or more second seeders are configured to download the one or more contents on the basis of the respective score value.

17. The method as claimed in claim 16, wherein the one or more second seeders are operatively configured with each other such that the one or more contents stored in any of the one or more second seeders are available to each of the one or more second seeders.

18. The method as claimed in claim 10, the method comprising updating the database every time the second set of signals are sent.

\* \* \* \* \*